June 20, 1933.　　　G. DOTTERWEICH　　　1,915,218
DIESEL ENGINE
Filed Sept. 14, 1929
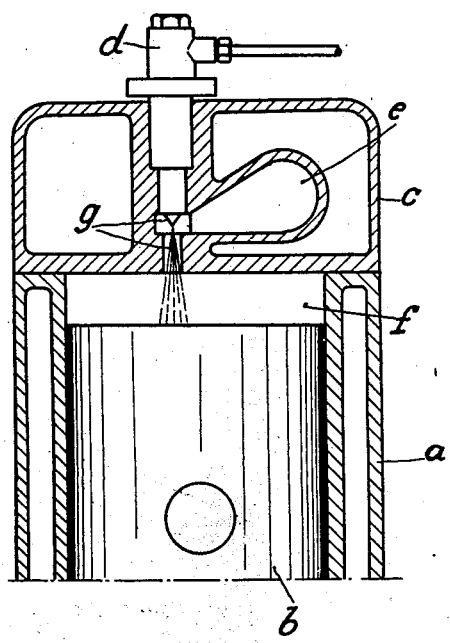
Inventor
Georg Dotterweich,
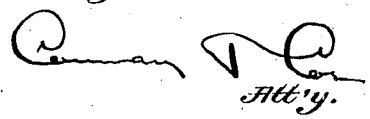
Att'y.

Patented June 20, 1933

1,915,218

UNITED STATES PATENT OFFICE

GEORG DOTTERWEICH, OF MANNHEIM, GERMANY, ASSIGNOR TO MOTOREN-WERKE MANNHEIM AKTIENGESELLSCHAFT VORM. BENZ ABT. STATIONÄRER MOTOREN-BAU, OF MANNHEIM, GERMANY, A COMPANY OF GERMANY

DIESEL ENGINE

Application filed September 14, 1929, Serial No. 392,614, and in Germany October 4, 1928.

In Diesel engines having the fuel injected without air and a supplementary combustion space with a restricted connection with the cylinder space, hitherto the fuel has either been injected into this supplementary space in what may be called the chamber type of engine, or it has been sprayed in through this space in what may be termed the prechamber type of engine. In these kinds of engines, the formation of the mixture for producing a combustion and an over-pressure in the supplementary combustion space takes place differently. In the prechamber type of engine the fuel is sprayed from the cover of the chamber through the whole length of the symmetrically formed prechamber with the aid of injection pressure; in the other type of engine the fuel is atomized through the cylinder space similarly by the spraying pressure in the chamber. In a particular class of engine, the filling process or the formation of eddies associated with it are merely used for the formation of the mixture in the chamber. In a further class of engine, the formation of the mixture and the formation of eddies were to be especially initiated between the divided spaces either by subdividing the chamber or by the differences in pressure which arise on ignition.

With progressive perfecting of the prechamber type of engine, the zone of strongest formation of mixture was situated more and more towards the restricted part. Constructions with flat pressed chambers arose, and with multiple-jet fuel nozzles, for as the nozzle was moved nearer to the restriction the formation of mixture in the chamber was insufficient.

All these kinds of construction of the prechamber type of engine, owing to the subdivision of the combustion space, the violent eddying and the partial combustion of the contents of the chamber, have a considerable transference of heat to the chamber walls and have an often undesired high delay in ignition.

These disadvantages are avoided by the invention. The object of the invention consists of a Diesel engine with injection of the fuel without air through a nozzle channel or passage leading into the cylinder. The essential feature of the invention consists in an air store or reserve communicating on one side with the nozzle channel and past which the fuel is injected.

Owing to the injection of the fuel past the air storage space, as later to be described, a formation of mixture takes place during the injection stage in the nozzle channel only, while in the air storage space itself pure or almost pure air remains. The function of this air store is to supply fresh oxygen present in the air constantly to the fuel in the nozzle channel during the time of injection for maintaining the over-pressure, and after completion of the injection stage, to push the resulting rich mixture as quickly and as completely as possible out of the nozzle channel into the cylinder so that the next ensuing injection again takes place in pure air. Any residues of the combustion in the nozzle channel are in this way oxidized. More moderate transfer of heat on the walls of the air space, lower consumption of fuel and effective carrying out of the ignition, combustion and working steps are the consequences.

A form of construction of the invention is illustrated by way of example in the annexed drawing. In this drawing, the working cylinder is shown at $a$, the piston at $b$, the cylinder head at $c$, the injecting valve at $d$, the air store space at $e$, the combustion space at $f$ and the nozzle channel at $g$. The latter, in the form of construction in the drawing, is subdivided into an upper part adjoining the injection nozzle and a lower narrower part receiving a lining, an ignition liner or the like.

The arrangement is applicable in the case of two cycle as well as four cycle engines. In view of the correspondingly great cross-sectional area of the air storage space $e$ as compared to the nozzle channel $g$ there is only a very minute pressure difference between these two. At the time of the beginning of the injection, which occurs just before the inner dead end and just before the end of the compression stroke when the compressed air has reached or exceeded the ignition temperature of the fuel, the pressure difference between that in the cylinder proper and that in the air storage space $e$ and nozzle channel $g$ is only sufficiently large to cause a very slight movement of air from the cylinder space $f$ through the nozzle channel $g$ into the air storage space $e$, and the ignition follows almost instantly without appreciable delay. No fuel or practically no fuel is therefore dispelled and carried back into the chamber $e$. If, during the injection, a few individual particles of atomized fuel are carried into the air storage space $e$ and there ignited, they will be opposed by the air under pressure within the storage space until the pressure falls within the cylinder whereupon they will be expelled. No supplemental ignition is used to empty the air storage space. The matter therein is expelled as a result of pressure differences and a regular operation and occurrence of ignition and combustion in proper sequence is assured.

The air storage space $e$ is valveless and air is supplied to the same during the compression stroke of the piston through nozzle channel $g$. The air compressed in the space $e$ at the end of the compression stroke is utilized in the combustion during the working stroke and the combustion products are removed during the succeeding stroke. Clean air is drawn into the cylinder during the following intake stroke and it is from this air that the storage space $e$ is supplied during the succeeding compression stroke.

The essence of the invention is not limited to any particular form and size of the air space. The drawing shows, by way of example, a bulb-shaped formation, and an arrangement in the cylinder head. The air space may also have any other suitable form and be separately inserted in the cylinder head or in the working cylinder, or may also be interchangeable. Further, different forms of construction of the nozzle channel are possible.

I claim:—

In an internal combustion engine having compression ignition, the combination of a cylinder, a piston mounted to reciprocate therein, a cylinder head closing said cylinder at the combustion end thereof and formed with a nozzle channel leading to said cylinder and serving as a mixing chamber, a valveless air storage chamber within said cylinder head to one side of said nozzle channel and terminating laterally in the nozzle channel, and a fuel valve in said cylinder head closing the nozzle channel to the outside and adapted to inject liquid fuel through the nozzle channel past the mouth of the air storage chamber into the cylinder, the cross-sectional area of such air storage space and of said channel being such that the difference in pressure between them and the space within the cylinder is negligible during compression.

In witness whereof I hereunto subscribe my name this 30th day of August 1929.

GEORG DOTTERWEICH.